US008634840B2

(12) United States Patent
Lindskog et al.

(10) Patent No.: US 8,634,840 B2
(45) Date of Patent: Jan. 21, 2014

(54) ALLOCATION AND PRIORITY HANDLING OF UPLINK AND DOWNLINK RESOURCES

(75) Inventors: Jan Lindskog, Pixbo (SE); Andreas Andersson, Landvetter (SE); Pär Ankel, Nödinge (SE); Anders Ranheim, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 456 days.

(21) Appl. No.: 12/867,328

(22) PCT Filed: Feb. 12, 2008

(86) PCT No.: PCT/EP2008/051639
§ 371 (c)(1),
(2), (4) Date: Aug. 12, 2010

(87) PCT Pub. No.: WO2009/100756
PCT Pub. Date: Aug. 20, 2009

(65) Prior Publication Data
US 2010/0311433 A1    Dec. 9, 2010

(51) Int. Cl.
*H04W 72/00*    (2009.01)
*H04B 7/212*    (2006.01)

(52) U.S. Cl.
USPC .................. 455/450; 370/348; 455/452.1

(58) Field of Classification Search
USPC .................. 455/450, 424, 452.1, 67.11, 410; 370/348, 350
See application file for complete search history.

(56) References Cited

U.S. PATENT DOCUMENTS

| | | | |
|---|---|---|---|
| 6,680,922 B1 * | 1/2004 | Jorgensen | 370/328 |
| 6,975,869 B1 * | 12/2005 | Billon | 455/452.1 |
| 7,616,603 B2 * | 11/2009 | Anderson et al. | 370/329 |
| 7,746,840 B2 * | 6/2010 | Lee | 370/348 |
| 8,005,481 B2 * | 8/2011 | Bergstrom et al. | 455/450 |
| 2004/0258026 A1 * | 12/2004 | Lau | 370/335 |
| 2005/0047360 A1 * | 3/2005 | Love et al. | 370/324 |
| 2007/0042784 A1 * | 2/2007 | Anderson | 455/450 |
| 2007/0149128 A1 * | 6/2007 | Das et al. | 455/67.11 |
| 2008/0200146 A1 * | 8/2008 | Wang et al. | 455/410 |

FOREIGN PATENT DOCUMENTS

WO    WO 2006/126920 A    11/2006

* cited by examiner

*Primary Examiner* — George Eng
*Assistant Examiner* — Sowmini Nair

(57) ABSTRACT

A telecommunication system comprises a radio network controller (RNC), and a Node-B (NB) for enabling wireless communication with a user terminal (UE). The RNC establishes an enhanced dedicated transport channel (E-DCH) which enables uplink data traffic with a determined maximum data rate from the user terminal (UE) to the NB. The RNC further establishes a high speed DL shared channel (HS-DSCH) which enables downlink data traffic with a determined maximum data rate from the NB to the user terminal. The NB comprises a HSDPA scheduler (HS-S) scheduling the data rate for the DL data traffic via the HS-DSCH and a EUL scheduler (EUL-S) scheduling the maximum data rate for the UL data traffic via the E-DCH. The NB exchanges data rate information between the HS-S and the EUL-S. Furthermore, the NB monitors the quotient (Q) between DL data rate and the UL data rate. When Q fulfils determined traffic conditions the HSDPA scheduler (HS-S) and/or the EUL scheduler (EUL-S) changes the allocation and/or the priority handling of the UL and/or the DL resources.

15 Claims, 8 Drawing Sheets

ALLOCATION AND PRIORITY HANDLING OF UPLINK AND DOWNLINK RESOURCES

TECHNICAL FIELD

The embodiments refer to a method and a telecommunication system for allocation and priority handling and a Node-B in the system enabling said method.

BACKGROUND

There is an increasing need of delivering wireless technology with broadband capacity for cellular networks. A good broadband system must fulfil determined criteria, such as high data rate and capacity, low cost per bit, good Quality of Service and greater coverage. High Speed Packet Access (HSPA) is an example of a network access technology that enables this.

HSPA is a collection of protocols which improves the performance of existing Universal Mobile Telecommunication Systems (UMTS), which is a third generation (3G) cell phone technology. UMTS uses Wideband Code Division Multiple Access (WCDMA) as air interface for the radio-based communication between user equipment (UE), in form of a mobile terminal, and the Node-B (NB). The air interface in the Open Systems Interconnection (OSI) model comprises layers 1 and 2 of the mobile communications system, establishing a point-to-point link between the UE and a radio access node (RAN).

WCDMA is a wideband spread-spectrum air interface that utilizes the direct sequence Code Division Multiple Access (CDMA) signalling method to achieve higher speeds and to support more users. The key features for WCDMA are:
  Two 5 MHz radio channels for Uplink (UL) and Downlink (DL) channels respectively.
  Support of two basic duplex modes, Frequency division (FDD) and Time division (TDD).

HSPA is an integral part of WCDMA. Wide-area mobile coverage can be provided with HSPA. It does not need any additional spectrum or carriers. Currently, WCDMA can provide simultaneous voice and data services to users on the same carrier. This also applies to HSPA which means that spectrum can be used efficiently. Simulations show that in a moderately loaded system, HSPA can largely reduce the time it takes to download and to upload large files.

HSPA is the set of technologies defining the migration path of WCDMA operators worldwide. The two existing features, High Speed Downlink Packet Access (HSDPA) and High Speed Uplink Packet Access (HSUPA), in the HSPA family provides the increased performance by using improved modulation schemes and by refining the protocols by which handsets and Node-B's communicate. These improvements lead to better utilization of the existing radio bandwidth provided by UMTS.

High Speed Downlink Packet Access (HSDPA) is the first feature within HSPA. It is part of the WCDMA Third Generation Partnership Project (3GPP) Release 5 specification. HSDPA provides a new downlink transport channel—the
  the High Speed Downlink Shared Channel (HS-DSCH)— that enhances support for high-performance packet data applications. A new Medium Access Control (MAC) sublayer, MAC-hs (high speed), has been introduced which enables a functional split between layers and nodes from different releases of WCDMA. MAC-hs handles HS-DSCH.

In FIGS. 1 and 2, a HSDPA/HSUPA network overview is indicated. FIG. 1 illustrates a network with only one node of each kind while FIG. 2 illustrates the same network with more than one node of each kind. The network comprises a Core Network (CN) communicating with at least one Radio Network Controller (RNC) 12,12',12" over the Iu interface. At least one Node-B (NB) 11,11',11" comprises a EUL scheduler unit EUL-S. The EUL Scheduler is also denoted the MAC-e Scheduler, and communicates with the respective RNC over respective Iub interfaces. HSUPA will be described more in detail later. The Node-B also comprises a HSDPA scheduler HS-S. The HSDPA Scheduler is also denoted the MAC-hs Scheduler, and communicates with the RNC over the Iub interface.

The following HSDPA channels are transmitter over the air interface:
  HS-SCCH to provide timing and coding information, thus allowing the UE to listen to the HS-PDSCH at the correct time and using the correct codes to allow successful decoding of UE data.
  HS-PDSCH to convey the MAC-hs payload
  HS-DPCCH to convey control signalling of the MAC-hs.

HSDPA is based on shared channel and multi-code transmission. This means that some channel codes and the transmission power in a cell are seen as a common resource that is dynamically shared between users in the time and code domains. This is for a more efficient use of available codes and power resources in WCDMA. It is also based on high-order modulation, in which 16 Quadrature Amplitude Modulation (16QAM) is used to provide higher data rates. HSDPA is further based on fast link adaptation, in which the transmission parameters are adjusted instantaneously to the radio conditions reported by the User Equipment (UE) and when conditions permit, enable high-order modulation.

In HSDPA fast scheduling is used, which feature operates with the objective to transmit to UEs with favourable radio conditions. Another basic principle with HSDPA is fast Hybrid Automatic Repeat Request (HARQ). The UE can combine information from different transmissions of a particular data packet in its decoding of the packet and will indicate the status of the decoding to Node-B, which in case of unsuccessful decoding retransmits the packet.

In HSDPA, the Transmission Time Interval (TTI) is 2 ms, which reduces the round-trip time (RTT) for end-user applications. RTT is a measure of the time it takes for a packet to travel from a User Equipment (UE), across a network to e.g. another users' UE, and back. Transport protocols like TCP, which expect an acknowledgement to arrive after data has been successfully received, keep an estimate of the current RTT on each connection. TCP use the RTT estimate to determine how long to wait for an acknowledgement before retransmitting.

High Speed Uplink Packet Access (HSUPA) is the second feature within HSPA. It is part of the WCDMA Third Generation Partnership Project (3GPP) Release 6 specification. HSUPA is also called Enhanced Uplink. In HSUPA, a new MAC sublayer, MAC-e, has been introduced which enables a functional split between layers and nodes from different releases of WCDMA. HSUPA provides a new uplink (UL) transport channel called Enhanced Dedicated CHannel (E-DCH) which is handled by MAC-e. HSUPA increases the uplink data rate. This technology gives the possibility to significantly increase the amount of data uploaded over mobile networks, especially user-generated content. Although a majority of the data traffic is downlink oriented, there are still quite a number of applications that will benefit from an improved uplink. These include the sending of large e-mail attachments, pictures, video clips, blogs etc. HSUPA is also known as Enhanced UL.

One concept of Enhanced Uplink is multi-code transmission, which means that the E-DCH transport channel can be transmitted over several channelization codes, to increase the size of the E-DCH for one UE. Another concept of EUL is a shorter TTI, 2 or 10 ms for the UL. Also HSUPA uses HARQ. The Node-B can request retransmission of erroneously received data. Soft handover is also possible with HSUPA, in contrast to HSDPA. HSUPA further also uses fast scheduling to enable rapid resource reallocation between UEs by exploiting the "burstiness" in packet data transmissions.

The following HSUPA channels are transmitted over the air interface:

- The E-AGCH to convey absolute grant signalling from the MAC-e scheduler towards the UEs
- The E-RGCH for relative grant signalling
- E-HICH to convey acknowledgement feedback from Node-B decoding of UE transmitted data
- Dedicated Physical Channel (DPCH) or Fractional DPCH to convey Transmit Power Control (TPC) commands
- Enhanced DPDCH (E-DPDCH) to convey the MAC-e payload
- Enhanced DPCCH (E-DPCCH) to convey the control signalling of the MAC-e.

As a basic principle of the uplink scheduling mechanism, the UE maintains a serving grant which represents the maximum E-DPDCH power the UE can use in the next transmission. The available uplink power determines the possible data rate. The absolute grant allows the Node-B scheduler to directly adjust the granted rate of UEs under its control. It is used to initialize the serving grant. The relative grants are used to incrementally adjust the UE's serving grants. As an input to the scheduling, UE feedback is required. The UE has the possibility to send scheduling information which provides detailed information about the buffer status in the UE as well as scheduling request, i.e. "lack of resources"/"enough resources". Therefore, the Node-B scheduler can make appropriate scheduling decisions.

HSDPA/HSUPA scheduling is provided by the scheduler entities (MAC-hs and MAC-e schedulers) located in the Node-B, close to the air interface.

As with any telecommunication technology, end-user performance with HSPA depends on the type of service and the behavior of higher-layer application protocols. Transmission Control Protocol (TCP) used for packet data services includes slow start and mechanisms which influence the performance. For instance in web-browsing it is possible that TCP and not HSPA as air interface that limits the performance. The main end-user benefit of HSPA for small objects transported via TCP is the reduced RTT, thanks to fast HARQ and short TTI. End-to-end latency, which is e.g. the average time for a packet from a UE, to a TCP/IP server and back, is a critical component that affects end-user perception of TCP/IP applications.

In contrast to web-browsing, TCP has very low impact on the time to download a large file, which means that the performance is largely determined by the data rate of the radio link. A single user downloading a large file can occupy a significant amount of the total cell capacity. Consequently, cell capacity has a substantial impact on the perceived performance when end-users download large files.

A wireless customer will typically use a laptop with a HSDPA and HSUPA(EUL) capable 3GPP pc-card or USB card or with preinstalled HSDPA/EUL 3GPP capabilities. When the customer starts its web browser the HTTP protocol will be used using the TCP/IP (Internet Protocol) protocol stack.

HTTP is a client-server protocol by which two machines can communicate over a TCP/IP connection. A HTTP server is a program that sits listening on a machine's port for HTTP requests. A HTTP client (typically the wireless customer) opens a TCP/IP connection to the server via a socket, transmit a request for a document, then waits for a reply from the server. Once the request-reply sequence is completed, the socket is closed.

In order to transmit user data in the uplink direction of 3GPP a Random Access Channel (RACH) channel can be used, preferably for smaller amount of data. RACH is used to get the attention of a Node-B in order to initially synchronize the UEs transmission with the Node-B. Either Dedicated Channels (DCH) or Enhanced Uplink channels (E-DCH) can be used for larger amount of data. In the downlink direction Forward Access Channel (FACH) can be used for smaller amount of data whilst DCH or HS-DSCH can be used for larger amount of data.

The forward access channel (FACH) is used for low volume data and is similar to the broadcast channel and random access channel of older mobile technologies. Use of the forward access channel (FACH) gives improved cell capacity at low data rates and thus improves the battery life of the mobile user terminal due to the lower transmission power that is required. A dedicated channel (DCH) of a cell is typically used for high volume data or voice.

It is up to each 3GPP vendor to decide when the switch between the various candidates for data forwarding shall occur, but it is often true that a switch over to E-DCH and HS-DSCH will occur when traffic volume increases over a specific level. It is also fully possible to set up HS-DSCH for downlink traffic and a DCH for uplink traffic. This is exactly what is being done for release 5 of the 3GPP network, whereas FACH/RACH often is the best solution for applications sending just a small amount of data, e.g. IP ping. It will be appreciated by those skilled in the art that a UE being in HS-DSCH/E-DCH state consumes more power than a UE in FACH/RACH state.

Assume that a wireless HTTP client requests for a download of a fairly large amount of data from a HTTP server, a guess is that RACH and FACH will be used for the initial setup of the TCP/IP duplex connection, and that HS-DSCH will be used for the bulk data transfer and E-DCH will be used primarily for the TCP acknowledgements in the direction from the client to the server.

Forthcoming releases of 3GPP will include a function denoted Continuous Packet Connectivity (CPC) which is mainly intended for the increasing deployment of applications which send small packets either continuously (e.g. VoIP) or intermittently (e.g. msn and push email). The CPC is configured by the RNC but can be turned on and off by the Node-B. It allows the UE to restrict the downlink reception times. With CPC the UE can increase its battery lifetime by reducing its power consumption in between such downlink reception times. With CPC the UE does not necessarily have to leave the HS-DSCH/E-DCH state in order to preserve power in the case of inactivity, but can remain in HS-DSCH/E-DCH state and be able to respond much faster to incoming network initiated traffic (e.g. msn). The scheduler entity for both HS-DSCH and E-DCH is located in the Node-B, from now on called MAC-hs Scheduler and MAC-e Scheduler. There are some problems where the absence of specified interactions between the scheduling entities, which may affect end user TCP throughput:

Scenario 1

Scenario 1 addresses situations when HSDPA and EUL are activated for a specific user in Node-B, but where no data is relayed neither in downlink or uplink for a specific period of time.

For HS-DSCH, the delay measured from the time when data is received from RNC until the same data is transmitted in a MAC-hs Protocol Data Unit (PDU) is in most situations low. At least when there does not exist any conflict with data to several end users that competes on getting a transmit opportunity.

PDU carries information that is delivered as a unit among peer entities in a network and it can contain control information, address information or data. In a layered system this means a data unit that is specified in a protocol of a given layer and that consists of protocol-control information of the given layer and often user data of that layer.

This low delay is due to the fact that the scheduler is located together with the HS-DSCH sending entity in Node-B and only internal signalling is required (close to the air interface). For E-DCH however, it will take a little longer time since the UE must signal up to the Node-B that a transmission is required (or that higher bandwidth is requested). Moreover, the Node-B must signal the (increased) granted transmission rate to the UE.

FIG. 3 shows an example where no grant is given to the UE. FIG. 3 illustrates the events that will take place in UE and Node-B in order to "prepare" for transmission from the UE. Enhanced Uplink (EUL) is used when data is received from higher layer at the UE. When data is received 1 from the RLC layer, a scheduling request is sent 2 to the Node-B as part of the MAC-e header. The MAC-e scheduler in Node-B receives 3 the scheduling request and a grant is sent 4 to the UE, signalling the permission to transmit. A rough estimate is that this procedure will take in the range between 30-100 ms, for a configuration with TTI=10 ms.

Let us now consider that a majority of the 3GPP related internet traffic from and to the UEs are downlink related, coming from e.g. UE starting web or file downloads when using web applications such as Internet Explorer. More data will subsequently flow downlink compared to uplink as seen from the Node-B point of view.

The dominating internet protocol is TCP. When the wireless HSDPA/HSUPA capable UE starts downloading a web page, its HTTP client HTTP-C will request a document from a HTTP server HTTP-S, see FIG. 4. FIG. 4 illustrates data direction flow 1 versus TCP Ack flow 2. TCP uses a network congestion avoidance algorithm mechanism. Some key features are then of interest:

1. Slow start.
   TCP uses a slow start, which means that whenever starting traffic on a new connection or increasing traffic after a period of congestion (overload), it starts the congestion window at a size of a single segment. It then increases the congestion window size by one segment each time an acknowledgement arrives. This result in an exponential increase, see ref 16 in FIG. 5. The congestion window is a state variable for each connection which is used by the sender to limit how much data a sender can transmit into the network before receiving an acknowledgement. Congestion window can never go above receiver window.
2. Congestion avoidance
   At a determined threshold, the congestion window will stop its slow start and enter a congestion avoidance behavior in which the congestion window increases linear, see ref 17 in FIG. 5. The threshold is at the beginning set to the receiver window. At packet loss or timeout TCP decreases its congestion window, but the details are left out of this document.

Using the key features (1 and 2 above) the data stream from the HTTP server down to the HTTP client expects to look as in the FIG. 5. At startup or when TCP detects packet losses, or when a timeout occurs due to long response times, TCP utilizes its slow start behavior. The purpose of slow start is to prevent congestion from occurring by varying the transmission rate. When this occurs the data rate will slowly increase exponentially, see FIG. 5. During these occasions Node-B traffic relay volume will be sparse.

The HSDPA and EUL protocols are semi-reliable in the sense that retransmission can and will occur. However, unlike protocols such as e.g. TCP, the HSDPA and EUL protocols do not require that every transmitted PDU are correctly delivered to the peer-entity. The Node-B and/or UE sending entity can discard data due to several reasons. One reason is that the total time from first transmission of a PDU has extended beyond the determined threshold. Another reason is that the current amount of retransmission for a specific PDU has extended beyond the determined threshold or a combination thereof.

When a discard occur, the RLC (Radio Link Control) protocol will detect the missing data at the peer entity and will perform a re-transmission. Now focusing on the downlink direction, since it was previously said that the dominating data direction was downlink. Then, where a discard occurs at the HSDPA protocol when the data throughput is low, it will usually take some time until the RLC layer performs a retransmission. The reason is simply due to the fact that RLC layer which operates in acknowledged mode will have a timeout based retransmission in the case of no response. During these occasions Node-B traffic relay volume will also be sparse.

Considering the fact that the dominating traffic is downlink related. Moreover, considering the fact that in 3GPP network packet losses can occur simply due to the wireless nature and the fact that RLC retransmissions will occur due to e.g. handover when a UE moves from one Node-B to another Node-B. With these facts many situations can be expected, when Node-B will perceive time periods with no data flowing neither in downlink or uplink. It will be appreciated by those skilled in the art that with CPC these periods of time with no data sent will increase simply because with CPC the UE can remain longer in its HSDPA and EUL state.

With the increasing amount of always-on application such as msn and push-email and the use of CPC situations can also be expected where no data is relayed neither in uplink or downlink as seen from Node-B, and where data will first come from the network side downlink to the UE.

There are some problems in relation to these periods with no data transmission situations. Focusing on Node-B, and upon when E-DCH has been activated, Node-B in such a situation (case A) at that time may have data pending in its buffer for downlink transmission, whilst it has no request for an uplink transmission nor has given any grant to the uplink transmission at the time of initialization. Alternatively (case B), no data exist in HS-DSCH transmit buffer and no grant is given to the uplink. At this point in time data will often be received in the HS-DSCH buffer. Of course it is also true that (case C) E-DCH can be setup with a default transmission of a grant allowing uplink transmissions.

Cases A and B are problematic, since it is in most case true that a response will be sent from the UE back to e.g. the TCP sender or the RLC sender confirming the successful reception of data. And as shown in FIG. 3 this can add an extra delay of approximately between 30 to 100 ms, for a 10 ms TTI.

Scenario 2

An alternative problem can occur when a level is reached where the granted uplink resource is larger than zero. The TCP data in downlink direction increases or due to a retransmission causes the TCP ACK volume to increase, by which the given granted rate in uplink is too low. This is also an example where one has to wait 30-100 ms before an increased uplink data transmission can take place.

Scenario 3

File downloads as described in scenario 1 will be characterized with first an increasing throughput up to a level in which throughput is close to its maximum, e.g. either limited by HTTP server or the wireless media, and finalized with an end of available data to download from the HTTP server. When this occurs it is possible that the UE is given a grant significantly larger than zero. Unless the UE itself indicate the absence of data to transmit, the Node-B has to determine the absence itself and reduce the grant for the UE to allow competing UE's to utilize the available resource. However, in both cases it is common that a too high bandwidth is granted for the UE, since the signalling or Node-B detection will take a certain time.

Scenario 4

In WCDMA Systems, resources for uplink data decoding (e.g. E-DPCCH, E-DPDCH) can be limited and typically the decoding resource allocation time is not zero. For this case it can be valuable to prepare the decoding resource allocation in advance, to save time. Allocation of decoding resources in a Node-B can be anything from close to 0 ms and more than 100 ms, depending on implementation (typically somewhere in between).

UE and 3GPP support multiple queues to be used, as well as part of the Internet protocol suite as well. This allows an UE to e.g. simultaneously perform a HTTP server request of a file download while using Voice over IP (VoIP).

Considering a situation where Node-B receives data to one UE related to multiple queues, e.g. VoIP and web browsing, typically the Node-B scheduler will prioritize one queue more than the other and transmit its data first. Assume further that the allocated decode resources are sufficient to support the resulting uplink data from the prioritized queue, but insufficient for the other queues. In this case a request to increase the decode resources will be performed once the MAC-e Scheduler detects the request to increase the uplink throughput for the said other queues, in which a long resource allocation time can affect the perceived throughput for the end user.

Scenario 5

In this scenario end users upload data to the internet. Consider the case when the UE might want to transmit a large file in uplink. With E-DCH the maximum rate is currently 5.74 Mbps (transport block rate). With 16 QAM and often Multiple Input Multiple Output (MIMO) this can increase further.

It is often that an increased uplink throughput will cause an increased TCP feedback signalling on HS-DSCH. It is also possible that the said corresponding TCP feedback bit rate is low compared to downlink traffic for other UE's that e.g. download web pages. Since the said corresponding TCP feedback throughput is low, it is not possible that the transmit priority for the said TCP feedback will affect the perceived throughput for the other UE's. That is, the end to end latency will not increase significantly since the TCP feedback bit rate is low. It is however possible that the transmit priority for the said TCP feedback will affect the perceived throughput for the UE that upload data. That is, the end to end latency can increase when the TCP feedback is delayed due to transmission of MAC-hs data to other UE's.

SUMMARY

The object of the present invention is to solve the problems relating to above-mentioned scenarios by a method, a telecommunication system and a Node-B for allocation and priority handling of uplink and downlink resources.

According to a first embodiment the present invention provides a method for allocation and priority handling of uplink (UL) and downlink (DL) resources in a telecommunication system comprising at least one radio network controller (RNC), and at least one Node-B (NB) for enabling wireless communication with at least one user terminal (UE) (15). The RNC establishes at least one enhanced dedicated transport channel (E-DCH). This enables uplink data traffic with a determined maximum data rate from the user terminal (UE) to the Node-B (NB). The RNC (12,12',12") further establishes at least a one high speed DL shared channel (HS-DSCH). This enables downlink data traffic with a determined maximum data rate from the Node-B (NB) to the user terminal (UE). The Node-B (NB) comprises a HSDPA scheduler (HS-S) scheduling the data rate for the DL data traffic via the HS-DSCH. It further comprises a EUL scheduler (EUL-S) scheduling the maximum data rate for the UL data traffic via the E-DCH.

In the first embodiment, the Node-B (NB) exchanges data rate information between the HSDPA scheduler (HS-S) and the EUL scheduler (EUL-S). Furthermore, the Node-B (NB) monitors the quotient (Q) between DL data rate and the UL data rate. Finally, wherein when Q fulfils determined traffic conditions, the HSDPA scheduler (HS-S) and/or the EUL scheduler (EUL-S) changes the allocation and/or the priority handling of the UL and/or the DL resources.

According to a second embodiment the present invention provides a Node-B which comprises a mechanism for allocation and priority handling of uplink (UL) and downlink (DL) resources in a telecommunication system. The system comprises at least one radio network controller (RNC), and at least the Node-B (NB), which further comprises a mechanism for enabling wireless communication with at least one user terminal (UE). The RNC comprises a mechanism for establishing at least one enhanced dedicated transport channel (E-DCH). This enables uplink data traffic with a determined maximum data rate from the user terminal (UE) to the Node-B (NB). The RNC (12,12',12") further comprises a mechanism for establishing at least one high speed DL shared channel (HS-DSCH). This enables downlink data traffic with a determined maximum data rate from the Node-B (NB) to the user terminal (UE). The Node-B (NB) comprises a HSDPA scheduler (HS-S) which comprises a mechanism for scheduling the data rate for the DL data traffic via the HS-DSCH. It further comprises a EUL scheduler (EUL-S) which comprises a mechanism for scheduling the maximum data rate for the UL data traffic via the E-DCH.

In the second embodiment, the Node-B (NB) comprises a mechanism for exchanging data rate information between the HSDPA scheduler (HS-S) and the EUL scheduler (EUL-S). Furthermore, the Node-B (NB) comprises a mechanism for monitoring the quotient (Q) between DL data rate and the UL data rate. Finally, the HSDPA scheduler (HS-S) and/or the EUL scheduler (EUL-S) further comprise a mechanism for changing the allocation and/or the priority handling of the UL and/or the DL resources. The change is performed when Q fulfils determined traffic conditions.

According to a third embodiment, the present invention finally provides a telecommunication system comprising a mechanism for allocation and priority handling of uplink (UL) and downlink (DL) resources in the system. The telecommunication system comprises at least one radio network controller (RNC), and at least one Node-B (NB) which comprises a mechanism for enabling wireless communication with at least one user terminal (UE). The RNC comprises a mechanism for establishing at least one enhanced dedicated transport channel (E-DCH). This enables uplink data traffic with a determined maximum data rate from the user terminal (UE) to the Node-B (NB). The RNC (12,12',12") further comprises a mechanism for establishing at least one high speed DL shared channel (HS-DSCH). This enables downlink data traffic with a determined maximum data rate from the Node-B (NB) to the user terminal (UE). The Node-B (NB) comprises a HSDPA scheduler (HS-S) which comprises a mechanism for scheduling the data rate for the DL data traffic via the HS-DSCH. It further comprises a EUL scheduler (EUL-S) which comprises a mechanism for scheduling the maximum data rate for the UL data traffic via the E-DCH.

In the third embodiment, the Node-B (NB) in the telecommunication system comprises a mechanism for exchanging data rate information between the HSDPA scheduler (HS-S) and the EUL scheduler (EUL-S). Furthermore, the Node-B (NB) comprises a mechanism for monitoring the quotient (Q) between DL data rate and the UL data rate. Finally, the HSDPA scheduler (HS-S) and/or the EUL scheduler (EUL-S) further comprise a mechanism for changing the allocation and/or the priority handling of the UL and/or the DL resources. The change is performed when Q fulfils determined traffic conditions.

The main advantage with the present invention is that with the use of the invention the TCP round trip time can be minimized resulting in a faster downloads. This is true based on the fact that the Node-B will try to predict when an uplink resource is needed and pre-allocate the resource in advance. The TCP round trip time can also be kept low at uploads. Further advantages will be described in the detailed description. Furthermore, network initiated traffic including RNC signalling traffic, and any network initiated traffic (push mail, msn etc) will have shorter start-up delays.

BRIEF DESCRIPTION OF DRAWINGS

In the following text the invention will be described in detail with reference to the attached drawings. These drawings are used for illustration only and do not in any way limit the scope of the invention.

DETAILED DESCRIPTION

Figure 1:
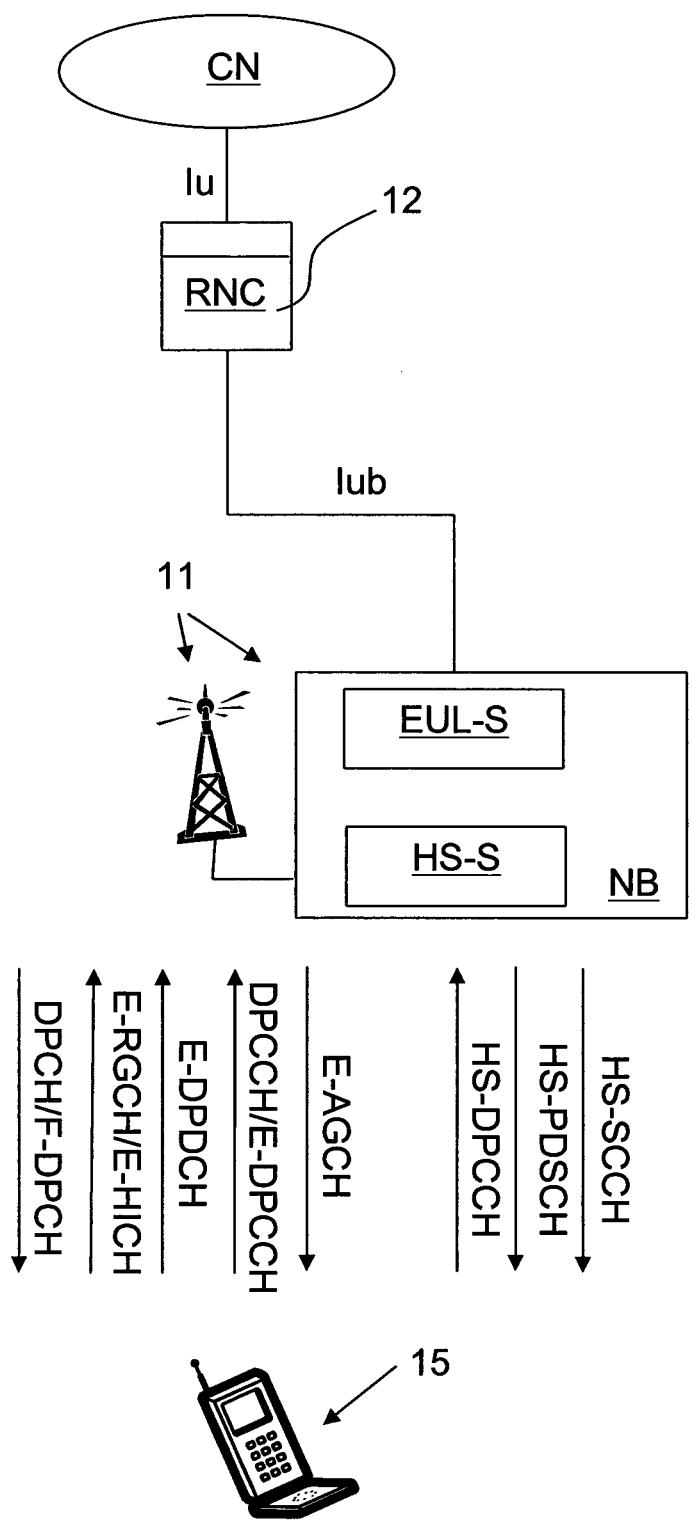
FIG. 1 shows a HSUPA/HSDPA network overview.

The invention will now be described in detail with reference to embodiments described in the detailed description and shown in the drawings.

The embodiments of the present invention refer to a method, a Node B for allocation and priority handling. The system and the Node-B in the system comprise mechanisms for performing the method steps as described in the method. It should therefore be understood by a person skilled in the art that the fact the system and the Node-B performs the method step means that the method embodiment described in the detailed description also includes the system and the Node-B even though not described in detail herein.

Figure 2:
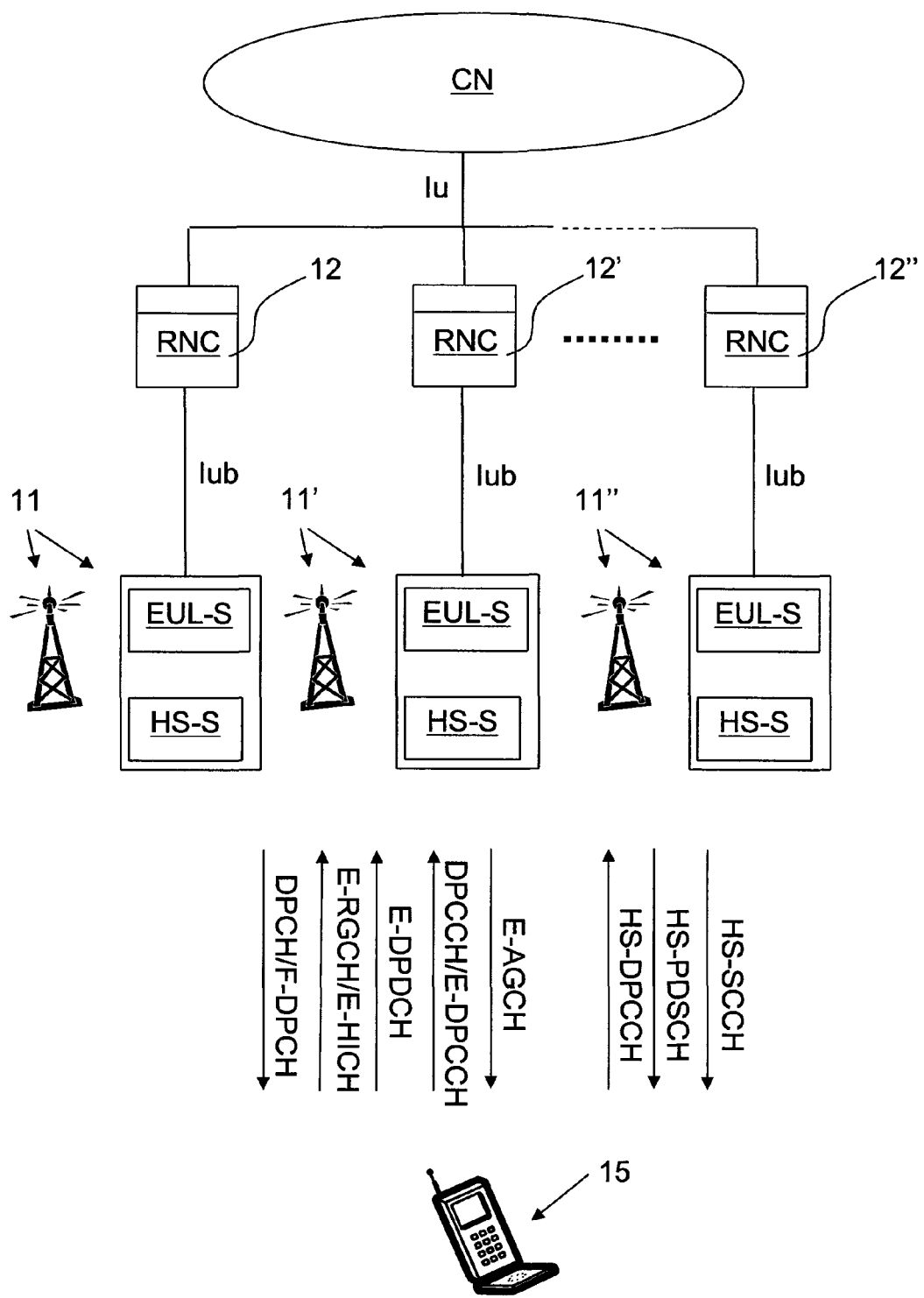
FIG. 2 shows a HSUPA/HSDPA network overview according to FIG. 1 with more than one node of each kind.

FIGS. 1 and 2 shows a HSUPA/HSDPA network overview. FIG. 1 illustrates a network with only one node of each kind while FIG. 2 illustrates the option that the same network has more than one node of each kind. A user terminal (UE) 15 communicates with the core network (CN) via at least one Node-B (NB) 11,11',11". At least one radio network controller (RNC) 12,12',12" establishes a E-DCH and a HS-DSCH, which enables uplink and downlink data traffic between the user terminal and the Node-B.

Note that the descriptive text below describes traffic to and from, the user terminal (UE) 15. However, it will be appreciated by those skilled in the art that the traffic to and from one user terminal can be from one or multiple queues (e.g. multiples MAC-d flows).

The present invention relates to a method for allocation and priority handling of uplink (UL) and downlink (DL) in a telecommunication system. The system comprises, see FIG. 1, a least one radio network controller (RNC) 12,12',12", and at least one Node-B (NB) 11,11',11" for enabling wireless communication with at least one user terminal (UE) 15.

The RNC 12,12',12" in the system establishes at least one enhanced dedicated transport channel (E-DCH), which enables uplink data traffic with a determined maximum data rate from the user terminal (UE) 15 to the Node-B (NB) 11,11',11".

The RNC 12,12',12" also establishes at least one high speed DL shared channel (HS-DSCH), which enables downlink data traffic with a determined maximum data rate from the Node-B (NB) 11,11',11" to the user terminal (UE) 15.

The Node-B (NB) 11,11',11" comprises a HSDPA scheduler (HS-S) scheduling the data rate for the DL data traffic via the HS-DSCH. The HSDPA scheduler before every new 2 ms Transmit Time Interval (TTI) (there are only 2 ms TTI in HSDPA while in EUL both 2 and 10 ms TTI are present) controls to which user terminals DL data is queued in the Node-B. Thereafter, the scheduler decides which part or element that should receive data first. At first, the scheduler for instance signals via the HS-SCCH channel, see FIG. 1, for which part or element the data is intended. Then the data traffic is sent on the HS-PDSCH channel. This is performed before every new TTI. Consequently, the HSDPA scheduler actively controls the data rate for every new TTI.

In contrast, a EUL scheduler (EUL-S) schedules the maximum data rate for the UL data traffic via the E-DCH. In practice, the data rate is scheduled by a power rate for the uplink transmissions. The EUL-S is part of the Node-B 11,11',11". This means that it is close to the air interface, for instance WCDMA in HSUPA. It operates on a request-grant principle. The user terminal (UE) 15 requests a permission to send data and the scheduler decides when and how much data a user terminal is allowed to send (maximum data rate), and also how many user terminals that will be allowed to do so. The EUL-S triggers E-AGCH/RGCH grant transmissions to the user terminal, but the decoding and the actual transmission of E-AGCH/RGCH is handled within the Node-B.

The EUL-S and the HS-S are located in the Node-B 11,11', 11" (NB) in order to move processing closer to the air interface and to be able to react faster on the radio link situation. A particular task of the schedulers is to control the uplink and the downlink decoding and encoding resources, which the user terminal 15 is using.

The scheduling enables the system to admit a larger number of high-data rate users, and rapidly adapt to interference variations in the cell. This leads to an increase both in capacity and the likelihood that a user will experience high data rates. It also enables the system to control that the cell interference are not so high that it causes disturbances in the cell. The details of scheduling will not be described further in this document since it is known from existing solutions and not part of the invention.

There are some problems with the absence of specified interactions between the HSDPA scheduler (HS-S) and the EUL scheduler (EUL-S), which sometimes affects end user TCP throughput. This was illustrated by five different scenarios. What is common for all these scenarios is that the UL grant needs to be changed due to a sudden change in the data traffic.

In order to solve these problems the invention is characterized in that the Node-B (NB) exchanges data rate information between the HSDPA scheduler (HS-S) and the EUL scheduler (EUL-S). The Node-B further monitors the quotient (Q) between DL data rate and the UL data rate. Finally, wherein when Q fulfils determined traffic conditions the HSDPA scheduler (HS-S) and/or the EUL scheduler (EUL-S) changes the allocation and/or the priority handling of the UL and/or the DL resources.

The data rate information is exchanged in every Transmit Time Interval (TTI). This means that the HSDPA scheduler sends the data rate information to the EUL scheduler and the EUL scheduler sends the data rate information to the HSDPA scheduler continuously, which is e.g. in every TTI. A person skilled in the art will appreciate that TTI sometimes differ between the EUL scheduler and the HSDPA scheduler.

The idea is consequently to let the Node-B (BS) 11,11',11" exchange data rate information between the schedulers and monitor the quotient Q. Dependent on averaging length when calculating the Q and utilising different thresholds when comparing the Q with previous values of Q, it is possible to distinguish between the various conditions, e.g. the problem scenarios described. This results in the change of the allocation and/or the priority handling of the UL and/or the DL resources. Moreover, by interchanging information between the HSDPA scheduler and the EUL scheduler the negative effects upon perceived user throughput can be mitigated.

When calculating the downlink data rate, various alternatives exists. What is common for all these alternatives is that it is calculated by using Medium Access Control High Speed (MAC-hs) data or Forward Access Channel (FACH) data. The alternatives for calculation of DL data rate are:
1. Acknowledged MAC-hs (from user terminal ACK'ed MAC-hs) throughput can be used.
2. Pending MAC-hs transmissions can be considered by estimating the corresponding kbps value. This can be used when fast reaction time is needed.
3. Total MAC-hs transmission rate (including MAC-hs retransmissions).
4. For 1, 2, 3 above one can also consider the SID value in the MAC-hs header
5. When no MAC-hs is set up for the user terminal (UE) 15, the rate sent on FACH can be used.
6. For 1, 2, 3, 4 above excluding/including MAC-d flows which represent RNC signalling traffic, e.g. RRC signalling.

The DL data rate information exchanged from the HSDPA scheduler (HS-S) to the EUL scheduler (EUL-S) can be one or more of the alternatives 1-6 listed above.

Also, when calculating the uplink data rate, various alternatives exists. What is common for all these alternatives is that the UL data rate is calculated by using Medium Access Control Enhanced (MAC-e) data, a grant that has been given to the user terminal (UE) 15, considering the amount of pending data in the UE via Scheduling information (SI) in E-DPDCH or Dedicated Channel (DCH) data. The alternatives for calculation of UL data rate are:
1. Acknowledged (ACK'ed by Node-B) MAC-es rate.
2. Acknowledged (ACK'ed by Node-B) MAC-e rate.
3. Total received MAC-e rate (unacked plus acked data)
4. The grant that has been given to the user terminal (UE) 15.
5. Considering the amount of pending data in the UE via Scheduling indication (SI) in E-DPDCH (the SI field represents the amount of pending data in the UE).
6. Total received DCH rate.
7. For 1, 2, 3, 4, 5 above excluding/including MAC-d flows which represents RNC signalling traffic, e.g. RRC signalling.

The UL data rate information exchanged from the EUL scheduler (EUL-S) to the HSDPA scheduler (HS-S) can be one or more of the alternatives 1-7 listed above.

Both the UL and the DL data rate calculation is performed by the Node-B 11,11',11". It can be performed by the HSDPA scheduler (HS-S) and/or the EUL scheduler (EUL-S) in the Node-B, which means that the calculation can be performed either by the HSDPA scheduler or the EUL scheduler or by both simultaneously. This is possible since the UL and DL data rate information is continuously exchanged between the schedulers, e.g. in every TTI. Both schedulers are therefore able to calculate one or both of the data rates.

The monitoring of (Q) is performed by the Node-B (NB) 11,11',11". The monitoring of the quotient (Q) can be performed by the HSDPA scheduler and/or the EUL scheduler (EUL-S) in the Node-B (NB), which means that the monitoring can be performed either by the HSDPA scheduler or the EUL scheduler or by both simultaneously. This is possible since the UL and DL data rate can be calculated by the HSDPA scheduler and/or the EUL-scheduler.

The determined conditions fulfilled by Q (for performing changes in the allocation and/or the priority handling of the UL and the DL resources) relates to a comparison between Q and a quotient Qold, Qold being a previous calculation of Q. This enables the detection of changed conditions in the system.

The calculated and monitored quotient Q can be based on DL and/or UL transmitted data. It should however be understood by the person skilled in the art that it can be based on data pending in the Node-B (NB) 11,11',11" or UE 15.

Figure 6:
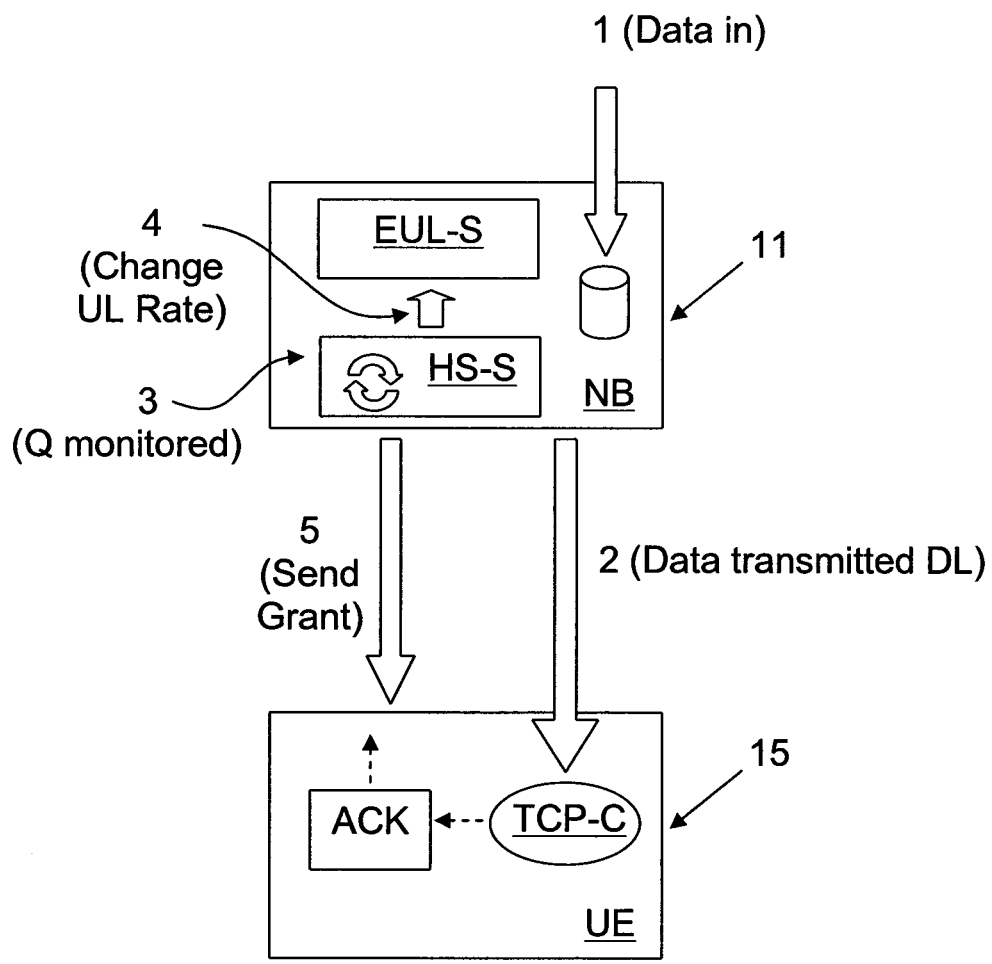
FIG. 6 shows the steps taken by the Node-B in order to pre-allocate uplink resources based on a sudden increase of DL data traffic.

The allocation and priority handling is illustrated in FIG. 6, which illustrates the steps taken in the Node-B (NB) 11,11', 11" in order to pre-allocate UL decoding resources based on a sudden change of DL transmitted data. In step 1, data is received DL by the Node-B. This data is transmitted 2 DL to the user terminal 15 on the HS-DSCH channel. The quotient Q is further monitored 3 by the HSDPA scheduler and/or the EUL scheduler by calculating Q and compare it with an earlier calculated Q.

As described earlier the UL and DL data rate information is continuously exchanged between the schedulers, in e.g. every TTI, and both schedulers are therefore able to calculate one or both of the rates and consequently both schedulers can monitor Q. When Q fulfils determined conditions the change of the allocation and priority handling according to the present invention is performed. This change corresponds to the HSDPA scheduler (HS-S) sending 4 an internal request to the EUL scheduler (EUL-S) to initiate the EUL scheduler allowance of changed maximum data rate for the UL data traffic via the E-DCH. Then a grant is sent 5 via the AGCH channel to the terminal.

When the pre-allocation is based on pending data, the monitoring of Q 3 and the sending 4 of an internal request is performed before the data is transmitted 2 DL to the user terminal 15 on the HS-DSCH channel.

Three embodiments will now be presented to illustrate the change of the allocation and priority handling of the UL resources according to the present invention. In these three embodiments, the system information exchange corresponds to the HSDPA scheduler (HS-S) sending an internal request to the EUL scheduler (EUL-S) to initiate the EUL scheduler allowance of changed maximum data rate for the UL data traffic via the E-DCH. The internal request can be a signal from the HSDPA scheduler (HS-S) to the EUL scheduler (EUL-S), where the EUL scheduler is responsible for the scheduling of the EUL. The HSDPA scheduler is responsible for the calculation of Q. The meaning of the request should be understood as an inquiry for UL resources. The HSDPA scheduler is not aware of the present scheduling of the UL. The skilled person will realize that Q can be calculated in either HSDPA scheduler HS-S and/or the EUL scheduler EUL-S.

In one of these three embodiments, Qold indicates that no data traffic is floating neither in the HS-DSCH or the E-DCH. Q then indicates that DL data traffic is starting to flow in the HS-DSCH. In such a situation, the HSDPA scheduler (HS-S) sends an internal request to the EUL scheduler (EUL-S) to initiate the EUL scheduler allowance of UL data traffic via the E-DCH.

The fact is that a majority of the 3GPP related internet traffic from and to the UEs are downlink related, coming from e.g. UE starting web or file downloads, when using web applications such as Internet Explorer. With TCP as the dominating internet protocol, it is possible that a scenario as described above will result in that a response will be sent from the UE back to e.g. the TCP sender or the RLC sender to confirm the successful reception of data at the UE.

Figure 3:
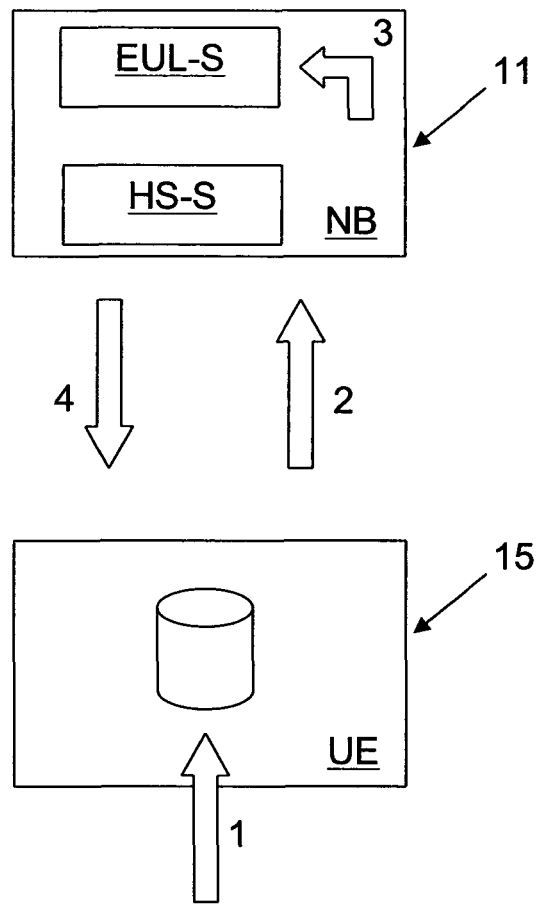
FIG. 3 shows the events that will take place in the user terminal and the Node-B in order to prepare for UL transmissions.
Figure 4:
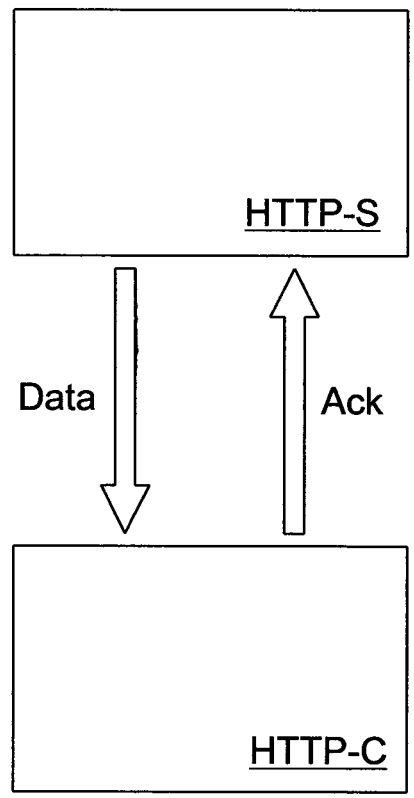
FIG. 4 shows the data direction flow vs. TCP Ack flow between an HTTP server and a HTTP Client.
Figure 5:
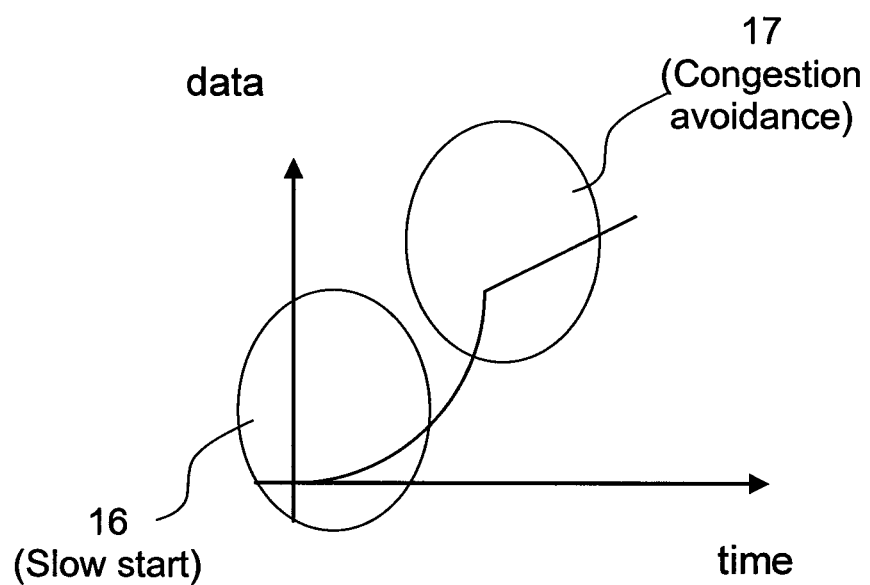
FIG. 5 shows the TCP slow start and congestion mechanism.

When now the Grant will take effect prior to that TCP sends an ACK, the user terminal (UE) 15 does not have to go through the steps in FIG. 3 and the effect will be a decrease of 30 to 100 ms in round trip time delay.

In general it can be said that the quotient Q can indicate when HS-DSCH starts to transmit data for a user terminal (or schedule a pending HS-DSCH transmission for a user terminal). This information is sent from the HSDPA scheduler to the EUL scheduler, so that the priority for this user terminal can be increased. That means the priority concerning the scheduled granted payload is increased, e.g. up to the payload needed for TCP ACK/NACK's or in general. This in order to maintain the grant, while the HS-DSCH is transmitting. Note that different user terminals treated within one EUL scheduler continuously compete for available resources.

It will be appreciated for those skilled in the art that Q can be monitored at E-DCH initialization to determine whether HS-DSCH is ongoing and that can for example cause a grant to be sent. It will also be appreciated by those skilled in the art that previous embodiments will be beneficial for RNC-generated signalling to and from the UE. The pre-generation of a grant will shorten the delay for the UE to send a response back to the RNC.

In a second of these three embodiments, when the quotient Q divided by Qold is larger than a first threshold value, this indicates that DL data traffic is increasing. The HSDPA scheduler (HS-S) then sends an internal request to the EUL scheduler (EUL-S) to initiate the EUL scheduler allowance of increased maximum data rate for the UL data traffic via the E-DCH. This second embodiment illustrates a solution to the $2^{nd}$ scenario, in which the available TCP ACK bandwidth was larger than zero. However, it was not large enough to avoid that the UL data traffic capacity for the user terminal (UE) 15 becomes restricted, and the UE will therefore request for more bandwidth.

Note that it is very often not feasible for the Node-B (NB) 11,11',11" to have control over the amount of TCP segments that is sent, since it would require a cross layer solution. It is thus not possible to distinguish whether the MAC-hs PDU comprised one or two or more TCP segments.

However, it is most likely that when the amount of downlink data increases, it is also most likely that the uplink resources will increase due to increased TCP ACK transmissions. The latter can easily be understood considering the widespread use of Windows XP TCP protocol stack. The reason is its implemented support of delayed ACK, wherein in a stream of full-sized TCP segments there should be an ACK for at least every TCP segments.

In the last of these three embodiments, when the quotient Q divided by Qold is lower than a second threshold value it indicates that DL data traffic is decreasing. The HSDPA scheduler (HS-S) then sends an internal request to the EUL scheduler (EUL-S). This is to initiate the EUL scheduler allowance of decreased maximum data rate for the UL data traffic via the E-DCH and/or allowance of lower priority within the EUL scheduler for the user terminal (UE) 15.

Allowing decreased UL transmission rate for the user terminal (UE) 15 means that the EUL scheduler provides more power headroom for other user terminals. Allowance of lower priority for the user terminal (UE) 15 gives the possibility for other user terminals with higher priority to exchange grant with the user terminal having reduced grant, when needed. One alternative solution within the third example is to not lower the grant, until it has been verified in the UL E-DCH decoding part that the user terminal 15 actually has started to transmit less data. Alternately, the user terminal (UE) 15 transmit buffer is sufficiently low (when this is known via SI signalling).

These three embodiments illustrate the fact that the EUL scheduler (EUL-S) allowance of changed maximum data rate for the UL data traffic via the E-DCH is performed by pre-allocating UL resources. With pre-allocation of UL resources, the steps of allocating HW and/or SW decoding resources is included. Moreover, increasing the EUL scheduler (EUL-S) allowance of changed maximum data rate for the UL traffic via the E-DCH by sending an absolute Grant or relative Grant.

According to one embodiment, when Q is based on data pending in the Node-B (NB) 11,11',11", the HSDPA scheduler (HS-S) informs the EUL scheduler (EUL-S) about which priority queues that contains data and how much, based on which information the EUL scheduler can pre-allocate UL decoding resources.

Alternatively, when Q is based on data pending in the Node-B (NB) 11,11',11", the EUL scheduler (EUL-S) controls which priority queues that contains data and how much, based on which information the EUL scheduler can pre-allocate UL decoding resources.

This embodiment illustrates when there are HS-DSCH data (data for DL) buffered on several priority queues. In this situation, all of the data can not be transmitted at once. The reason for is that there can only be transmission to a few user terminals at each time instant (limited by number of HS-SCCH channels per cell). Since Q is based on pending data transmissions, the HSDPA scheduler shall inform EUL scheduler about which priority queues that contains data and how much. Based on this the EUL scheduler can pre-allocate UL decoding resources, i.e. estimate future decoding resource needs.

This situation, with pending data, occurs when there is a lot of DL traffic to several user terminals. In such a situation, a lot of data is buffered in the Node-B (NB) 11,11',11". The HSDPA scheduler then works hard to serve all the priorities of the different terminals. Since there is a lot of buffered data, Q can be monitored on "coming DL traffic" (the buffered data). Q will consequently show that the DL rate will increase, and that the UL decoding resources is too small. Note that the changing of the UL grant has to be coordinated with the decoding resources, since it is not certain that the UL decoding resources can cope with an increased grant.

Two embodiments will now be presented to illustrate the change of the priority handling of the DL resources according to the present invention. These illustrate the fact that the HSDPA scheduler (HS-S) changes the priority for the DL queue to the user terminal (UE) 15 in dependency on the UL data rate. As described, the determined traffic conditions fulfilled by Q relates to a comparing between Q and a quotient Qold, Qold being a previous calculation of Q.

According to one of these two embodiments, when the quotient Q divided by Qold is lower than a third threshold value, it indicates that UL data traffic rate or the grant is increased. This can be an indication upon scenario 5 described earlier. The HSDPA scheduler (HS-S) then increases the priority for the corresponding DL queue for the user terminal (UE) 15. By this, the HSDPA scheduler can increase the priorization of e.g. expected TCP ACK/NACK in downlink, as a consequence to the increased uplink transmission rate. By increasing the priority for a specific queue for a particular UE the probability increases that the allocation of DL decoding resources will be executed.

According to the last of these two embodiments, when the quotient Q divided by Qold is lower than a fourth threshold value it indicates that data traffic rate or the grant for the user terminal (UE) 15 is reduced. The HSDPA scheduler (HS-S) then lowers or removes priority within the HSDPA Scheduler for the DL queue for the user terminal (UE) 15. By this, the HSDPA scheduler can lower or remove priorization of expected TCP ACK/NACK in DL.

Figure 7:
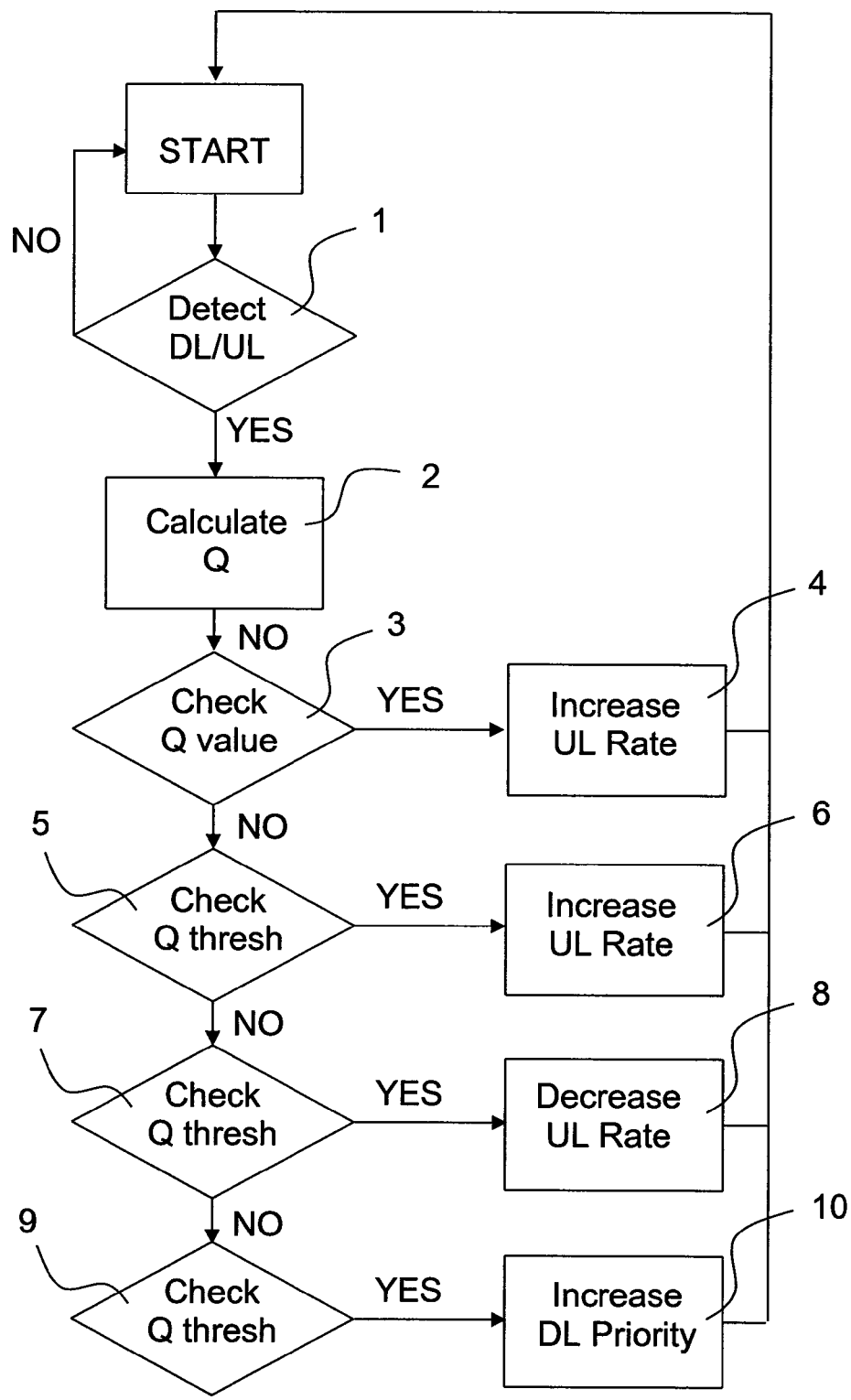
FIG. 7 shows a flow chart for the allocation and priority handling according to certain embodiments within the invention.

FIG. 7 shows a flow chart where most of the embodiments are executed. As default the HSDPA scheduler continuously sends data rate information to the EUL scheduler and the EUL scheduler continuously sends data rate information to the HSDPA scheduler in every TTI. This is how it is executed, by different steps:

Start.
1. A detection is made whether data is sent either downlink on HSDPA or uplink on EUL for UE=UEx (a user terminal (UE) 15). When the outcome of the detection in YES, go to step 2. When the outcome is NO, the detection is restarted (step START).
2. The Node-B (NB) 11,11',11" calculates the quotient (Q) as average data rate DL/average data rate UL for current UEx.
3. A check is made whether Q indicate that data has been sent (or is pending for downlink transmission) after a period of time when no data has been sent. This can for example be done by comparing previous value of Q (Qold) with new value of Q. When the outcome of the check is YES, go to step 4. When the outcome is NO, go to step 5.
4. An internal request is sent to EUL scheduler. EUL scheduler orders a transmission of an AGCH on downlink allowing an increased data rate from UEx. An increase is also sent to increase the available uplink decode resources for UEx. Alternatively the increase is made prior to sending AGCH or simultaneously.
5. A further check is made whether Q is larger than the first threshold (threshold a). The first threshold can e.g. be set to reflect when the Channel Quality Indicator sent uplink in HSDPA indicate that the radio quality has improved so much that user terminal (UE) 15 is capable to receive data sent with a higher modulation rate than earlier, i.e. due to the increase channel quality the downlink throughput increases, This should lead to an increased need to signal feedback uplink. When the outcome of the further check is YES, go to step 6. When the outcome is NO, go to step 7.
6. Similar effects as is step 4 will take effect.
7. Similar investigation as in step 5 is made. Note here that a second threshold (threshold_b) is less than 1, whilst the first threshold (threshold_a) is larger than 1. The same but reverse discussion as in step 5 can be done, detecting when the CQI has decreased reflecting a lower modulation rate which may lead to a lower downlink rate. When the outcome of the check in step 7 is YES, go to step 8. When the outcome is NO, go to step 9.
8. A similar but reverse action as in step 4 shall be done, causing an AGCH with decreased rate and a decreased need of decoding resources.
9. In this step a similar investigation as in step 5 is made. The difference here is that a third threshold (threshold_c) is less than the second threshold (threshold_b) in order to reflect the situation when a sudden increase is made in EUL data transmission, whilst the first and second thresholds (threshold_a/threshold_b) reflect the case when the main data flow is downlink. When the outcome of the check in step 9 is YES, go to step 10.
10. An increase is sent to HSDPA scheduler to increase the scheduling priority to prioritize downlink traffic for the corresponding user terminal (UE) 15.

Figure 8:
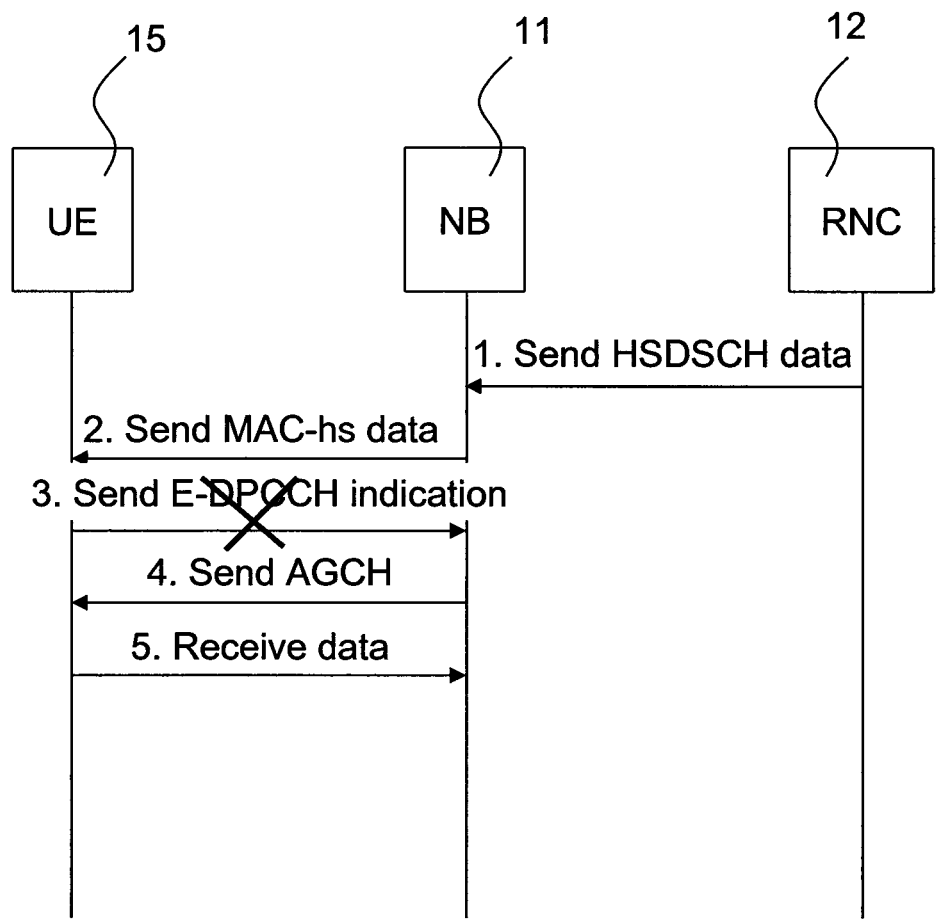
FIG. 8 shows the interaction between the Node-B and the user terminal.

FIG. 8 exemplifies the signalling between the Radio Network Controller (RNC) 12,12',12", the Node-B (NB) 11,11', 11" and the user terminal (UE) 15 according to existing technology and the three embodiments illustrating that the HSDPA scheduler sends and internal request to the EUL scheduler. The precondition is that HSDPA and EUL is active at the Node-B and that quotient Q indicate that no data is sent neither in downlink or uplink.

1. In both prior art and the invention, RNC 12,12',12" sends HS-DSCH data, including MAC-d data for user terminal (UE) 15, to the Node-B (NB) 11,11',11".
2. In both prior art and the invention, the Node-B (NB) 11,11',11" sends MAC-hs data on HS-SCCH and HS-PDSCH. As default the HSDPA scheduler continuously sends data rate information to the EUL scheduler and the EUL scheduler sends data rate information to the HSDPA scheduler, e.g. every TTI. In the invention, the HSDPA scheduler and/or the EUL scheduler further calculates Q indicating that a download has started, and sends an internal request to the EUL scheduler.
3. In both prior art and the invention, the user terminal (UE) 15 receives MAC-hs data and deliver data to higher layer. Higher layer in this example is first the RLC layer followed by the TCP layer. TCP layer send a TCP-ACK to RLC which sends data to MAC-e layer. In prior art, the Node-B (NB) has no granted rate and therefore sends E-DPCCH indicating lack of resources. Since this is not made in the present invention, which is actually the scope of the present invention, this arrow is crossed over. Instead, since user terminal (UE) 15 in step 3 has a granted rate of 32 kbps, user terminal (UE) 15 send data on E-DPCCH/E-DPDCH.

4. Since there is a pre-allocation of UL resources, the Node-B (NB) will wait for an E-DPCCH from the user terminal (UE) 15 indicating lack of resources before responding with an AGCH with a corresponding absolute grant rate of 32 kbps. (Note that AGCH content does not include a kbps value, but can be converted to a kbps value. Instead, the EUL scheduler in the Node-B (NB) 11,11',11" pro-actively sends AGCH with a corresponding absolute grant rate of 32 kbps.

5. Finally, in both prior art and the present invention. The Node-B (NB) 11,11',11" receives data on E-DPCCH/E-DPDCH The six different embodiments described illustrate different examples of information interchange between the EUL scheduler (EUL-S) and the HSDPA scheduler (HS-S). It should be understood by a person skilled in the art that problems related to the fact that uplink decoding (HW) resources sometimes takes time to allocate, can be mitigated in all six embodiments described above. A comment to all embodiments is that care must be taken when there exists a resource conflict in the uplink, meaning that the main purpose for the scheduler is to try to handle situations where the available bandwidth is less than required. In such a scenario it is not necessary that it is the correct way to pre-allocate resources as proposed here. However, the ideas can be useful in the case where a conflict does not occur.

It will be understood by those skilled in the art that average UL and DL rate calculation can be made using various methods already known, e.g. different sliding window averaging lengths, using different forgetting factors etc. Several calculating methods can also be used simultaneous. The present invention is further not limited to the embodiments described above and could be varied freely within the scope of the appended claims.

The invention claimed is:

1. Method for allocation and priority handling of uplink (UL) and downlink (DL) resources in a telecommunication system comprising at least one radio network controller (RNC), and at least one Node-B (NB) for enabling wireless communication with at least one user terminal (UE), the method comprising:
the RNC establishing at least one enhanced dedicated transport channel (E-DCH) enabling uplink data traffic with a determined maximum data rate from the user terminal (UE) to the Node-B (NB),
the RNC establishing at least one high speed DL shared channel (HS-DSCH) enabling downlink data traffic with a determined maximum data rate from the Node-B (NB) to the user terminal (UE),
the Node-B (NB) comprising a HSDPA scheduler (HS-S) scheduling the data rate for the DL data traffic via the HS-DSCH and an EUL scheduler (EUL-S) scheduling the maximum data rate for the UL data traffic via the E-DCH,
the Node-B (NB) exchanging data rate information between the HSDPA scheduler (HS-S) and the EUL scheduler (EUL-S),
the Node-B (NB) monitoring a quotient (Q) between DL data rate and the UL data rate,
the HSDPA scheduler (HS-S) or the EUL scheduler (EUL-S) changing the allocation or the priority handling of the UL and the DL resources at least partially based on a comparison between the Q and a quotient Qold, Qold being a previous calculation of the Q.

2. The method for allocation and priority handling according to claim 1 wherein the DL data rate is calculated by using Medium Access Control High Speed (MAC-hs) data or Forward Access Channel (FACH) data, and the UL data rate is calculated by using Medium Access Control Enhanced (MAC-e) data, a grant that has been given to the user terminal (UE), or Dedicated Channel (DCH) data.

3. The method for allocation and priority handling according to claim 1 wherein the calculation and the monitoring of the quotient (Q) is performed by the HSDPA scheduler (HS-S) or the EUL scheduler (EUL-S).

4. The method for allocation and priority handling according to claim 1, wherein the data rate information is exchanged in every Transmit Time Interval (TTI).

5. The method for allocation and priority handling according to claim 1, wherein Q is based on data pending in the Node-B (NB).

6. The method for allocation and priority handling according to claim 1, wherein the change of the allocation or the priority handling of the UL or the DL resources corresponds to the HSDPA scheduler (HS-S) sending an internal request to the EUL scheduler (EUL-S), to initiate the EUL scheduler (EUL-S) allowance of changed maximum data rate for the UL data traffic via the E-DCH, or
when Qold indicates that no data traffic is floating either in the HS-DSCH or the E-DCH. and Q indicates that DL data traffic is starting to flow in the HS-DSCH, the HSDPA scheduler (HS-S)sends an internal request to the EUL scheduler (EUL-S) to initiate the EUL scheduler allowance of UL data traffic via the E-DCH, or
when the quotient Q divided by Qold is larger than a first threshold value DL data traffic is increasing and the HSDPA scheduler (HS-S) sends an internal request to the EUL scheduler (EUL-S)to initiate the EUL scheduler allowance of increased maximum data rate for the UL data traffic via the E-DCH, or
when the quotient Q divided by Qold is lower than a second threshold value, it indicates that DL data traffic is decreasing and the HSDPA scheduler (HS-S) sends an internal request to the EUL scheduler (EUL-S), to initiate the EUL scheduler allowance of decreased maximum data rate for the UL data traffic via the E-DCH or allowance of lower priority within the EUL scheduler for the user terminal (UE).

7. The method for allocation and priority handling according to claim 6, wherein the EUL scheduler (EUL-S)allowance of changed maximum data rate for the UL data traffic via the E-DCH is performed by pre-allocating UL resources.

8. The method for allocation and priority handling according to claim 6, wherein when Q is based on data pending in the Node-B (NB), either the HSDPA scheduler (HS-S) informs the EUL scheduler (EUL-S) about which priority queues that contain data and how much, based on which information the EUL scheduler can pre-allocate UL decoding resources, or the EUL scheduler (EUL-S) controls which priority queues that contain data and how much, based on which information the EUL scheduler can pre-allocate UL decoding resources.

9. The method for allocation and priority handling according to claim 1, wherein when the quotient =Q divided by Qold is lower than a third threshold value, it indicates that UL data rate or the grant is increased and the HSDPA scheduler (HS-S) increases the priority for the corresponding DL queue for the user terminal (UE): and wherein when the quotient Q divided by Qold is lower than a fourth threshold value, it indicates that data rate or the grant for the user terminal (UE) is reduced and the HSDPA scheduler (HS-S)lowers or removes priori~ within the HSDPA Scheduler for the DL queue for the user terminal (UE).

10. A Node-B comprising a mechanism for allocation and priority handling of uplink (UL)and downlink (DL) resources in a telecommunication system comprising at least one radio network controller (RNC), and at least the Node-B (NB) further comprising a mechanism for enabling wireless communication with a user terminal (UE), the RNC comprising a mechanism for establishing an enhanced dedicated transport channel (E-DCH) enabling uplink data traffic with a determined maximum data rate from the user terminal (UE) to the Node-B (NB), the RNC further comprising a mechanism for establishing a high speed DL shared channel (HS-DSCH) enabling downlink data traffic with a determined maximum data rate from the Node-B (NB) to the user terminal (UE), the Node-B (NB) comprising:
- an HSDPA scheduler (HS-S) comprising a mechanism for scheduling the data rate for the DL data traffic via the HS-DSCH,
- an EUL scheduler (EUL-S) comprising a mechanism for scheduling the maximum data rate for the UL data traffic via the E-DCH,
- a mechanism for exchanging data rate information between the HSDPA scheduler (HS-S) and the EUL scheduler (EUL-S), and
  - a mechanism for monitoring a quotient (Q) between DL data rate and the UL data rate, wherein the HSDPA scheduler (HS-S) or the EUL scheduler (EUL-S) further comprising a mechanism for changing the allocation and/or the priority handling of the UL and/or the DL resources, the changing being performed at least partially based on a comparison between the Q and a quotient Qold, Qold being a previous calculation of the Q.

11. The Node-B (NB) according to claim 10 wherein the HSDPA scheduler (HS-S) and the EUL scheduler (EUL-S) comprises:
- a mechanism for calculating the DL data rate by using Medium Access Control High Speed (MAC-hs) data or Forward Access Channel (FACH) data,
- a mechanism for calculating the UL data rate by using Medium Access Control Enhanced (MAC-e) data,
- a grant that has been given to the user terminal (UE), or Dedicated Channel (DCH) data, and
- a mechanism for performing the monitoring of the quotient (Q).

12. The Node-B (NB) according to claim 10, wherein the Node-B (NB) comprises a mechanism: for exchanging the data rate information in every Transmit Time Interval (TTI).

13. The Node-B (NB) according to claim 10, the HSDPA scheduler (HS-S) comprising

- a mechanism for sending an internal request to the EUL scheduler (EUL-S) to initiate the EUL scheduler allowance of changed maximum data rate for the UL data traffic via the E-DCH, corresponding with the change of the allocation or the priority handling of the UL and/or the DL resources, and
- a mechanism for informing the EUL scheduler (EUL-S) about which priority queues that contain data and how much, based on which information the EUL scheduler can pre-allocate UL decoding resources, the informing being performed when Q is based on data pending in the Node-B (NB).

14. The Node-B (NB)according to claim 13 wherein the EUL scheduler (EUL-S) comprises a mechanism for controlling which priority queues contain data and how much, based on which information the EUL scheduler can pre-allocate UL decoding resources, the controlling being performed when Q is based on data pending in the Node-B (NB).

15. A telecommunication system comprising:
- a mechanism for allocation and priority handling of uplink (UL)and downlink (DL) resources in the system,
- a radio network controller (RNC), and
- a Node-B (NB)comprising
  - a mechanism for enabling wireless communication with a user terminal (UE), the RNC comprising
    - a mechanism for establishing an enhanced dedicated transport channel (E-DCH) enabling uplink data traffic with a determined maximum data rate from the user terminal (UE) to the Node-B (NB)
    - a mechanism for establishing a high speed DL shared channel (HS-DSCH) enabling downlink data traffic with a determined maximum data rate from the Node-B (NB) to the user terminal (UE), the Node-B (NB) comprising
    - a HSDPA scheduler (HS-S) comprising a mechanism for scheduling the data rate for the DL data traffic via the HS-DSCH and
    - an EUL scheduler (EUL-S) comprising a mechanism for scheduling the maximum data rate for the UL data traffic via the E-DCH,
  the Node-B (NB) further comprising
    - a mechanism for exchanging data rate information between the HSDPA scheduler (HS-S) and the EUL scheduler (EUL-S),
  - a mechanism for monitoring the quotient a (Q) between DL data rate and the UL data rate, the HSDPA scheduler (HS-S) or the EUL scheduler (EUL-S) further comprising
    - a mechanism for changing the allocation or the priority handling of the UL or the DL resources at least partially based on a comparison between the Q and a quotient Qold, Qold being a previous calculation of the Q.

* * * * *

UNITED STATES PATENT AND TRADEMARK OFFICE
CERTIFICATE OF CORRECTION

PATENT NO.        : 8,634,840 B2                              Page 1 of 1
APPLICATION NO.   : 12/867328
DATED             : January 21, 2014
INVENTOR(S)       : Lindskog et al.

It is certified that error appears in the above-identified patent and that said Letters Patent is hereby corrected as shown below:

In the Specification

In Column 1, Line 59, delete "the High" and insert -- High --, therefor.

In the Claims

In Column 17, Line 44, in Claim 1, delete "Method" and insert -- A method --, therefor.

In Column 18, Line 31, in Claim 6, delete "E-DCH." and insert -- E-DCH --, therefor.

Signed and Sealed this
Fifteenth Day of July, 2014

Michelle K. Lee
*Deputy Director of the United States Patent and Trademark Office*